US012806523B2

(12) United States Patent
Couthier et al.

(10) Patent No.: US 12,806,523 B2
(45) Date of Patent: Nov. 24, 2026

(54) GENERATING AN ACOUSTIC ENVIRONMENT MODEL

(71) Applicant: Sony Interactive Entertainment Europe Limited, London (GB)

(72) Inventors: Loic Couthier, London (GB); Alexei Smith, London (GB); Nick Ward-Foxton, London (GB); Atsushi Suganuma, London (GB); Christopher Buchanan, London (GB); Lewis Thresh, London (GB); Michael Eder, London (GB); Lewis Barn, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 272 days.

(21) Appl. No.: 18/654,663

(22) Filed: May 3, 2024

(65) Prior Publication Data

US 2024/0367046 A1 Nov. 7, 2024

(30) Foreign Application Priority Data

May 5, 2023 (GB) ...................................... 2306680

(51) Int. Cl.
*A63F 13/54* (2014.01)

(52) U.S. Cl.
CPC ........ *A63F 13/54* (2014.09); *A63F 2300/538* (2013.01)

(58) Field of Classification Search
CPC ................ A63F 13/54; A63F 2300/538; A63F 2300/6615; A63F 2300/6063; H04S 2400/11
See application file for complete search history.

(56) References Cited

U.S. PATENT DOCUMENTS

| | | | | |
|---|---|---|---|---|
| 10,248,744 | B2 * | 4/2019 | Schissler | G06V 10/764 |
| 10,293,259 | B2 * | 5/2019 | Ballard | A63F 13/57 |
| 10,911,885 | B1 * | 2/2021 | Chemistruck | H04S 7/303 |
| 11,563,513 | B1 | 1/2023 | Lohr | |
| 12,210,095 | B1 * | 1/2025 | Alfonso | G01S 15/8995 |
| 2003/0007648 | A1 * | 1/2003 | Currell | H04S 7/305 381/63 |
| 2005/0182608 | A1 * | 8/2005 | Jahnke | A63F 13/54 703/6 |
| 2012/0105473 | A1 | 5/2012 | Bar-Zeev et al. | |

(Continued)

OTHER PUBLICATIONS

NPL Acoustic rendering based on Geometry Reduction and Acoustic Material Classification published 2022 IEEE Conference on Games (CoG) by Colombo et al. Aug. 24, 2022 (Year: 2022).*

(Continued)

*Primary Examiner* — Peter J Iannuzzi
(74) *Attorney, Agent, or Firm* — Fish & Richardson P.C.

(57) ABSTRACT

A computer-implemented method for generating an acoustic environment model for a video game level is provided. The method comprises: obtaining graphical data for visually rendering a gameplay environment of the video game level, the graphical data comprising a three-dimensional geometrical model for the gameplay environment, and generating, based on the graphical data, an acoustic environment model corresponding to the gameplay environment and adapted for the simulating of gameplay sounds therein.

20 Claims, 5 Drawing Sheets

(56) References Cited

U.S. PATENT DOCUMENTS

| | | | |
|---|---|---|---|
| 2019/0208181 | A1 | 7/2019 | Rowell et al. |
| 2022/0326527 | A1 | 10/2022 | Taylor et al. |
| 2022/0377485 | A1 | 11/2022 | Raghuvanshi |
| 2024/0098234 | A1 | 3/2024 | Friedman et al. |
| 2024/0179487 | A1* | 5/2024 | Pind ........................ G06F 30/23 |
| 2024/0378100 | A1 | 11/2024 | Thresh et al. |

OTHER PUBLICATIONS

Combined Search and Examination Report for UK Application No. GB2306680.6 dated Oct. 25, 2023, 7 pages.

Extended European Search Report in European Appln. No. 24171604.2, mailed on Jan. 15, 2025, 15 pages.

Partial European Search Report in European Appln. No. 24171604.2, mailed on Oct. 31, 2024, 13 pages.

Siltanen et al., "Geometry Reduction in Room Acoustics Modeling," ACTA Acustica United with Acustica, May 2008, 94(3):410-418.

Sluyts et al., "Case study: the influence of model size on local room acoustic parameters in Odeon," Proceedings of Building Simulation 2021: 17th Conference of IBPSA, Sep. 2021, pp. 2805-2812.

Colombo, M, et al., "Acoustic Rendering Based on Geometry Reduction and Acoustic Material Classification", IEEE Conference on Games (CoG), Aug. 2022, 8 pages.

* cited by examiner

GENERATING AN ACOUSTIC ENVIRONMENT MODEL

CROSS-REFERENCE TO RELATED APPLICATION

The present application claims priority from United Kingdom Patent Application No. GB2306680.6, filed May 5, 2023, the disclosure of which is hereby incorporated herein by reference.

FIELD OF THE INVENTION

The present invention relates to a method for generating an acoustic environment model for a video game level.

BACKGROUND

During video game development, in which a game's mechanics, gameplay, and levels are established, a sound design team creates a sound plan that outlines the different types of sounds that will be used in the game, where they will be placed, and how they will interact with the environment and gameplay. When the design is implemented, which includes the coding, art, animation, and sound, a sound design team creates audio assets, such as music tracks and sound effects, and integrate them into the level for use by the game engine. In order to define where and how sounds will be heard based on the position and movement of a player or sound receiver in the virtual world during gameplay, soundboxes are defined in specific areas of the level. Soundboxes are geometric volumes defined within an in-game environment for making audio sound, that is be perceivable in, a certain way during gameplay. The same audio cue may be made to sound a different way in different soundboxes, for instance, inside or outside a house, in a desert, in a tunnel and the like.

Conventionally, soundboxes created for virtual spaces within video game levels often go through several iterations when edited by the level designers until the level is 'locked', during which time the original soundboxes may not correspond to the virtual spaces they are intended to encompass. This leads to soundboxes being placed in sub-optimal arrangements that result in inaccurate, unrealistic, off-putting, or disorienting sound simulation, and can require these acoustic models to be updated manually or entirely recreated, which takes significant time and resources. Risks also exist of changes made to graphical or other aspects of a level during its creation not being notified, which can lead to soundboxes, and necessary updates and corrections to them, being missed.

There exists a need for a more rapid, accurate, and efficient approach to creating acoustic models for video game levels.

SUMMARY

In accordance with a first aspect of the invention there is provided a computer implemented method for generating an acoustic environment model for a video game level, the method comprising: obtaining graphical data for visually rendering a gameplay environment of the video game level, the graphical data comprising a three-dimensional geometrical model for the gameplay environment, generating, based on the graphical data, an acoustic environment model corresponding to the gameplay environment and adapted for the simulating of gameplay sounds therein.

The inventors have realised that the process of video game level design can be significantly improved by using graphical data for a gameplay environment as an input for the creation of acoustic environment models adapted for simulating sounds in the environment. In particular, three-dimensional geometrical models that have been produced for the purposes of rendering the visual appearance of a video game level environment or the manner in which the environment is to be rendered or interacted with during gameplay, can be used as a basis for creating acoustic environment models that enable the more accurate and reliable simulation of in-game sounds, and do so with improved computational efficiency. The aforementioned acoustic environment may be understood as being a simulated acoustic environment, for example because it comprises a virtual representation of a geometrical space for the purpose of, for instance, simulating how sound waves travel in that space, reflect off surfaces therein, and interact with objects and features of the geometry and layout of the gameplay world. The generating of such a simulated acoustic environment in such an accurate manner can allow game developers to apply, with greater realism, audio tools and techniques such as reverb effects, sound filters, and spatial audio in a manner consistent with the acoustic qualities that the gameplay environment represented in the graphical data would have.

The said graphical data may be understood as data that is suitable for use by a game engine in visually rendering the gameplay environment. Generally, the graphical data may include digital assets, such as three-dimensional models, textures, and animations that have been created or obtained by developers for creating and populating visual and player-interaction aspects of the video game level. The method may involve the use of such assets in generating the acoustic environment model, or enhancing it. However, the use of three-dimensional geometrical information comprised by the graphical data is of importance to the creation of suitably dimensioned and appropriately placed audio-relevant regions, or soundboxes, within the gameplay environment.

It will be understood that the term "environment" in this context refers to an in-game space that, during gameplay, is to be rendered visually using the graphical data, and have sounds therein simulated using the acoustic environment model. The said environment may correspond to any area in-game with a given set of associated sound characteristics. Multiple sets of sound characteristics, for example corresponding to multiple soundboxes, may be created using the method for a given environment.

Typically, it is desired during game development for different environments in a level to be configured to sound differently to a player, and to have different sound characteristics. Preferably, the method involves generating an environment model for each environment of a video game level in which sound is to be stimulated during gameplay. For example, preferably, different environments may be associated with different audio characteristics that are manifested during gameplay, for instance different ambient sounds, different reverberation qualities, different non-diegetic sounds, and different soundtrack music, which may be employed where a transition between two areas or sound spaces corresponds to a transition between different stages of gameplay narrative or different gameplay types. Typically the gameplay environment within or forming part of the videogame level is one of a plurality of gameplay environments in the level. However, it is envisaged that, in some embodiments, a level may comprise a single environment.

The three-dimensional geometrical model for the gameplay environment may in some embodiments be thought of as a model representing the level or a portion thereof, that is, a graphical representation of a three-dimensional environment within the level.

The acoustic environment model may be referred to in some embodiments as soundbox data. The acoustic environment model may comprise one or more soundboxes, and typically a gameplay environment that comprises, at least by virtue of the graphical data representing it, greater numbers of spaces such as rooms or structures, interactive or animated objects, different surface textures, and different environment types, will lead to the method generating greater numbers of soundboxes for the acoustic environment model. The acoustic environment model may be referred to acoustic environment data, and may be thought of as acoustic model data representative of the gameplay environment.

A generated acoustic environment model, and/or any three-dimensional region or geometrical model it comprises, may be placed within the graphical model, so that the respective components of a game engine can render the visual environment while accurately simulating appropriate audio therein.

The acoustic environment model corresponding to the gameplay environment typically means that the former is at least a representation of the same space, that is the virtual space represented by the graphical model. In preferred embodiments, the acoustic environment model is similar, substantially identical, or identical, to the three-dimensional geometrical model comprised by the graphical data in terms of any one or more of: a one-, two-, or three-dimensional extent of a gameplay zone or region; extent and location of boundaries of a gameplay zone or region; and extent and location of any objects in a gameplay zone or region.

The simulating of gameplay sounds may refer to acoustic simulation, and in particular the simulating of sound propagation. Additionally or alternatively, the simulating of sounds may involve the activating, deactivating, modulating, or filtering of various diegetic and non-diegetic sound cues.

As noted above, an acoustic environment model typically comprises one or more soundboxes. Each soundbox may be understood as, or may be defined by, a set of boundaries. In preferred embodiments, these boundaries typically comprise two-dimensional walls, and are typically arranged so that together the boundaries at least partly enclose or substantially enclose a volume, or three-dimensional region, in which in-game sound is to be rendered in a particular manner.

The method can include various techniques for generating the acoustic environment model. In some preferred embodiments, the generating of the acoustic environment model comprises: identifying, in the three-dimensional geometrical model, one or more boundaries of a region of the gameplay environment, and defining, based on the identified boundaries, a set of surfaces arranged to enclose a three-dimensional region within the acoustic environment model.

The one or more boundaries may be identified from surfaces present in the graphical model. For example, they might correspond to any one or more of a wall, floor, ground, ceiling, landscape features, flora, and objects. Such surfaces may be identified as boundaries of a space in which gameplay sound is to be processed or simulated in a certain way, and may be used as a basis for walls of a soundbox. Conversely, a negative identification may be made for some surfaces that are present in the graphical model. That is, in some cases the size and/or position of a surface or set of surfaces in a graphical model might be such that the surface or set forms a visual boundary of the graphical environment, that is one that we would be perceived as a physical structure or a physical bound to a zone or area in the level. However, the method may nevertheless be configured to identify such surfaces or sets thereof as not being a boundary for the purposes of sound propagation or processing. For instance, a curtain or a shroud of smoke may be present in the graphical model and may obscure part of a room or render it invisible or not traversable. Visually, such geometrical features may be rendered in a manner akin to a wall. However, preferably the method does not treat certain geometrical structures in the graphical model, such as these, as being relevant to acoustics or suitable for generating a corresponding soundbox wall. The determination that a structural surface present in the graphical model ought not to be incorporated into the acoustic model may be made, for example, based on inferences drawn from the graphical data. These could, for instance, indicate the physical properties of the virtual surface or structure as making it unsuitable for, or unnecessary for, treatment as a sound-relevant boundary. Such properties that may be inferred from the graphical data as part of the method may include geometrical properties such as thickness or the presence of gaps or perforations through which sound may pass, and material properties such as mass, density, and resilience. Accordingly, the method may comprise generating the soundbox or defining walls thereof based on one or more acoustic characteristics that may be estimated for a bounding surface, for example acoustic transmittivity. Characteristics may be signalled explicitly within the graphical data, or may be inferred therefrom as mentioned above, based on one or more properties such as morphology and surface texture. Alternatively or additionally, boundaries may be identified by inferring the extent or limits of a given area or from the level of other information.

Boundaries may also be identified in other ways, based on a type of environment represented in the graphical model and/or information in that model indicating the extent of an environment, as is described in detail later in this disclosure.

In this disclosure, the term "boundary" may be understood as referring to a virtual boundary or edge that defines a playable area or the limits of the game world. Typically it is a set of data that defines geometrically where players and objects can move or interact with an environment within the level. Boundaries can be present in the graphical data in various forms, such as physical barriers such as walls or cliffs, invisible barriers such as force fields, or an edge of the game world or an environment therein. Preferably, the method includes identifying the said one or more boundaries in accordance with an assessment as to whether a boundary is relevant to audio simulation, which is typically performed using a set of audio relevance criteria. Such a criterion may include assessing whether a boundary is present in one or both of a graphical geometrical model and a physics model, whether a boundary present in the graphical data has collision, and inferred or signalled physical, geometrical, material, or acoustic properties as alluded to above.

The said region of the gameplay environment may typically correspond to a given playable area. For example, a region may be a room with bounding surfaces simply being a wall, floor, ceiling, door, and/or windows surfaces within the room. As noted above, the identified boundaries within the region typically form a boundary of the region. Preferably, a boundary represents or corresponds to a boundary to the 3D region corresponding to the environment to be rendered using the graphical data. The defining of the set of surfaces may be thought of as generating a set of surfaces. This generating is preferably based on the major surfaces of the gameplay environment. Typically, the walls or faces of a soundbox are based on such boundaries, for example, the walls, floor, and ceiling of a room. That is to say, a soundbox may be created that has a similar size, shape, and/or aspect ratio to the graphically represented region. These geometrical similarities are typically of fundamental importance to the acoustics of a space. Basing the soundbox face size and placement on these therefore facilitates the simulation of sound propagation in a way that recreates or closely approximates realistic behaviour of sound waves in the region of the gameplay environment.

It will be understood that the set of surfaces may be a set of one or more surfaces. Preferably, however, the set comprises a plurality of surfaces. It would be understood, that certain in-game environments might be modelled as only a single surface, for example a floor, which would be suitable for simulating a desert environment for instance.

Typically one or each of these surfaces in the set is planar, or substantially so. It is in this way that they may be understood as being faces of a soundbox. In some embodiments, a surface may be defined with a curved shape, or a shape containing one or more deviations from a plane. For example, for a soundbox generated to represent an environment that is at the bottom of a well, the soundbox may comprise only two surfaces, that is those representing a floor and representing a cylindrical wall.

Generally, in this disclosure the expression "wall" typically refers to a bounding face. Such walls need not be horizontal within the spatial coordinate system of the game level. These faces can have other orientations and so may correspond to a wall, floor, ceiling and the like in the virtual space. Any soundbox surface or wall may, in some embodiments, be curved, tessellated, or comprise additional geometrical detail. Preferably, however, such soundbox walls of surfaces are considerably simpler geometrically than the corresponding surface in the graphical model. It would be understood that soundbox walls are typically defined by the method in such a way that they represent an approximation, or a geometrical simplification, of the bounding surfaces in the graphical model.

Each of the set of surfaces preferably has a position and/or orientation within the acoustic environment model, and typically this is based on the position and orientation of a corresponding identified boundary in the three-dimensional graphical geometrical model. As noted previously, a surface may be a geometrical simplification or approximation of an identified boundary. For example, typically an input graphical model may include a level of geometrical detail appropriate for rendering a realistic environment by a graphics engine, whereas a set of surfaces defining a soundbox in the generated acoustic model comprise a simple set of planes bounding or at least partly enclosing an equivalent virtual space, which is typically a simple polyhedron. A surface or plane of a soundbox is typically placed so as to be coincident with, and preferably at least substantially coplanar with, a major face of a boundary or surface identified as a boundary in the graphical model. It will be understood that this might not be the case, however, for instance when boundaries are identified from information other than the presence of a surface or structure in the graphical model.

The set of surfaces being arranged to enclose the three-dimensional region may be understood as that set of surfaces being arranged to enclose, or at least partly enclose the region. That is to say, the generated soundbox walls may entirely surround the interior of the soundbox volume, or may partly surround it, such that the soundbox is partly open. This may be appropriate, for example, where an input graphical model represents a courtyard, in which no ceiling is required. In such cases, excluding a plane or soundbox surface corresponding to a ceiling of the soundbox would be preferably excluded by the method from the acoustic environment model, on the basis that such a surface or additional plane would be unnecessary for, and actually in some cases detrimental to, the realistic simulation of acoustic reverberation in the space. On the other hand, the vertical surrounding walls, and the horizontal plane which may be defined to represent the floor, would preferably be included in that example.

The method may involve defining a plurality of three-dimensional regions, and/or walls defining their boundaries, by way of inferring the presence of multiple zones in the level that can be associated with respective, potentially different, acoustic characteristics. For example, to adjoining rooms may be identified in a level, from the graphical model data, by way of detecting one or more surfaces of a wall structure separating them in the geometrical data, and two respective soundboxes may be defined accordingly. It will be understood that any one or more of the set of surfaces defined for a soundbox may be common to, shared with, and/or serve as a bounding plane or surface of, another soundbox, or multiple other soundboxes, in dependence on the layout of the video game level. Moreover, a surface, or soundbox wall, may add or alter the bounding of a three-dimensional region or soundbox, or may subdivide it. It will be understood that the "three-dimensional region" described earlier in this disclosure may be referred to as a "soundbox". The soundbox may additionally or alternatively be used to refer to the faces or surfaces that bound, or at least substantially bound, the three-dimensional volume.

In some embodiments, a soundbox or three-dimensional region may be cuboidal. Different morphologies in the graphical model and identifiable boundaries therein may lead to the method producing such shapes, and other shapes, for the soundbox region. Typically, for example, the method may define a soundbox shape as a prism, with parallel faces corresponding to a floor and ceiling of the environment, and other faces being defined in accordance with the position and orientation of walls or other boundaries in the graphical space. More generally, a soundbox may be a polyhedron, in particular a convex polyhedron. The acoustic environment model may be thought of as a geometrical model, albeit one that is preferably geometrically simpler than that comprised by the graphical data.

The generation of soundboxes based on graphical data for a level allows the efficient and accurate creation of acoustic models that are important to realistic in-game audio. Advantageously, the method may also ascribe certain acoustic properties to a soundbox that it creates, preferably also using the graphical model data for the environment to do so. This can further increase the accuracy of the acoustic simulation, as well as the speed with which sound models can be created during the development of a game. In some preferred embodiments, therefore, the generating of the acoustic environment model comprises assigning, to the three-dimensional region, and/or to the acoustic environment model, in particular a portion of it, or a simplified model of it, as is described later in this disclosure, one or more audio characteristic parameters. As described earlier in this disclosure, the method can involve the creation of multiple sound spaces in an in-game environment. For example, if physical boundaries separating such sound spaces can be identified based on the graphical model data. The method may accordingly include assigning a sound characteristic to each soundbox based on graphical data for the respective space or room, for example. As an example, objects within a room, surface textures such as hard floors, soft carpets, and wall coverings, may be used in this process. The resulting audio environment can thus include appropriately different-sounding rooms and other spaces based on the intended content and acoustic qualities of the sound-absorbing and/or sound-reflecting surfaces therein.

Audio characteristics may be associated with the environment or soundbox as a whole, and/or specific surfaces therein, and/or portions of the surfaces, in the acoustic environment model. These may correspond to walls, floors, floor coverings, water areas, for example. Characteristic parameters are typically configured to cause a game audio engine to render, simulate, modulate or otherwise modify an in-game sound in a particular way. For example, this may occur during gameplay when sounds or actions in the environment interact with those surfaces or portions of them, or occur in the space. Preferably, the one or more audio characteristic parameters comprise any one or more of: a surface texture parameter, a reverberation parameter, a room acoustics parameter, a room size parameter, and an environment type parameter. A function or algorithm may be used to analyse the graphical information and generate the audio characteristic parameters. For example, such an approach may involve assessing or analysing various properties of the game environment, based on the graphical data, to predict acoustic properties and generate appropriate acoustic effects. The method may therefore further comprise generating the one or more audio characteristic parameters based on the graphical data.

In such embodiments, the generating of an audio characteristic parameter may be based on any one or more of: analysing the spatial arrangement of features of the three-dimensional geometrical model, inferring material properties of features of the three-dimensional geometrical model, and thereby preferably acoustic properties thereof, inferring atmospheric conditions, for instance environmental sounds such as wind, based on windblown, which can be based for instance on windblown graphical or animated elements, a wet floor, still air, thick fog, and the like, and predicted ambient sound. The inferred material properties may be based on one or each of: shapes of features, for instance estimating likely materials based on three-dimensional forms such as that of a curtain in the earlier-described example, and visual data representing an appearance of a surface, such as image data or texture maps. Acoustic surface qualities might be directly inferred from such information.

The method may achieve this by analysing the three-dimensional geometry of the graphical environment to determine the shapes and sizes of objects and/or surfaces also. This information can be used to predict how sound waves can interact with the surfaces and objects, including reflections, diffractions, absorptions and the like, and create a characteristic based thereon. This may be applied to the simplified model or the soundbox. For example, it will be understood that an empty room will have different reverberation qualities to a room full of furniture. Likewise, a large room will sound different from a small room. In this way the geometry itself, either before simplification or soundbox transformation, afterwards, or both, may be used to ascribe a characteristic to a soundbox in the acoustic model.

In some embodiments, the method may employ an algorithm to use information about materials and textures of surfaces and objects in the graphical data to predict their acoustic properties, such as absorption coefficients and scattering characteristics. For example, a hard, smooth surface such as a marble floor would have different acoustic properties from a soft, rough surface like a carpet, and the said algorithm may determine appropriate acoustic characteristics from information in the graphical data that is used to render or visually indicate those materials in the level.

The algorithm may also, or alternatively, take into account the size and placement of objects within the environment, as well as any atmospheric conditions that might affect the propagation of sound waves, such as temperature, humidity, and air pressure. The algorithm may use any one or more of such factors to predict how sound would behave within the environment and generate appropriate acoustic effects, such as reverb, echo, and attenuation.

In some embodiments, the algorithm may employ applying predicted ambient sounds to a soundbox, for example wind, rain, traffic and the like, in order to enhance further the audio experience during gameplay. By simulating the acoustic characteristics of the environment, and the soundboxes therein, in this manner, the algorithm may create a more realistic, immersive, and accurately reproduced audio environment that enhances the realism of the gameplay.

Some sets of graphical data representing a level sets of graphical data might not contain all of the data necessary for representing all of the physical, or acoustics-relevant boundaries present in the virtual space. This is typically because some physical boundaries or surfaces in a gameplay area might not be visible, owing to lighting conditions in the environment, and so might not be present in the geometrical model. Preferably, in order to address this, the method may involve the interpretation of the three-dimensional graphical model to predict certain elements that are not present therein. An algorithm may be provided for this purpose.

For example, in a large, dark cavern in a level, the physics and/or graphics engine might not require a ceiling to be defined in the three-dimensional game environment model, for the reason that it would not be visible or interacted with by the player or any in-game elements. However, a boundary prediction function, or boundary prediction algorithm, may be provided that detects the lack of such structures, such as a lack of a ceiling in the aforementioned example, and automatically place one at the expected height for the generated soundbox, based, for instance, on other detected features in the game environment. In some cases, the placement of predicted soundbox walls such as this may be based simply on the algorithm recognising that a boundary or structure is missing, and placing one at an estimated or predefined height, location, or position in the level coordinates system. Preferably, however, the boundary prediction algorithm is configured to predict an appropriate placement, orientation, methodology and/or extent based on the analysed geometry of features present in the graphical model.

The boundary prediction function, in some preferred embodiments, preferably includes flagging such additions and changes for review by a user, such as a sound designer. Thus the function may comprise outputting a notification of a predicted boundary being generated.

Preferably, the identifying of one or more boundaries comprises: applying a boundary prediction function to the three-dimensional geometrical model so as to predict therefrom, that is based on the three-dimensional geometrical model, one or more further boundaries; and defining at least one further surface, such as a soundbox wall or face, of the said set of surfaces, for instance by analysing the geometry of the environment, for each predicted further boundary.

The expression "prediction" as used in this context does not necessarily refer to anticipating or foretelling, but rather to estimating or otherwise calculating. These terms may refer to that function as such interchangeably. In other words, the function is adapted to predict further boundaries insofar as this relates to producing information that is unknown, or at least explicitly represented in, the graphical information. In the case of the cavern example given above, the algorithm may detect the walls and floor of the cavern, and then use that information to predict an appropriate height for the ceiling. It will be understood that the boundary prediction function is preferably configured to predict further surfaces that ought to exist but are not represented in the graphical model. In some cases in which this function is employed, the graphical model may be more complete, for example a small, well-lit room, and so the function might not necessarily produce any further boundaries if none are determined by the function to be missing. As with the other surfaces in the said set thereof, the at least one further surface may define any one or more of a minimum, maximum, average, linear or two-dimensional size, orientation, position in the environment, or with respect to other surfaces in the set. The defining of the at least one further surface of the said set may be thought of as adding any such further surfaces, for example omitting ceiling, or an absent bottom of a pit, to those surfaces that defined the soundbox and have been generated from the graphical model directly.

A boundary prediction function may be configured to detect boundary structures, or features such as walls and floors, present in the three-dimensional geometrical model and, based on the detected boundary structures, to predict one or more further boundary structures that should exist, for instance in order for the environment to be structurally sound within the virtual space, or realistic in terms of its construction, topology, or geometry, or to create a structurally or physically complete, realistic, or immersive game environment, and are absent from the three-dimensional geometrical model. The predicted structures, in typical embodiments, are preferably boundary structures, that is representations of physical structures present in the virtual space that bound an acoustic zone. A cave ceiling is an example of such a structure.

In other words, an algorithm is preferably provided that can detect where a graphical model does not include one or more structures that would be present, but perhaps not necessarily visible, in the type of environment or structure that the graphical model represents.

An example boundary prediction algorithm may analyse the geometry of the graphical environment using processes such as 3D point cloud segmentation.

In such embodiments, a 3D point cloud may be understood as a collection of points in three-dimensional space that represent the geometry of the environment. These points may be obtained from various sources, such as a 3D scanner, a game engine physics engine, which calculates the collision points between objects in the game environment, or from the graphical geometrical model directly. The algorithm may then use machine learning techniques, such as clustering algorithms, to group these points into segments based on their spatial relationships. These segments can correspond to different features in the environment, such as walls, floors, columns, and other structures. Once the segments have been identified, the algorithm may employ geometrical and physical principles to predict where other boundaries and structures ought to be placed. For instance, returning to the cavern example, the algorithm may in some embodiments use segments representing walls and the floor of the cavern to predict where the feeling should be placed based on the size and shape of the cavern. Generally, the prediction algorithm may use a combination of machine learning and geometrical principles to analyse the three-dimensional geometry of the environment based on the graphical or physics model, and make prediction about where boundaries and structures should be placed.

In addition to, or alternatively to, detecting physical boundaries, in some embodiments the method may use an algorithm to detect changes in the game environment that may not necessarily correspond to physical boundaries in the in-game world, but nevertheless require separate soundboxes, or a partition or face subdividing a given soundbox into two distinct regions to be placed. Therefore, preferably the boundary prediction function is configured to identify one or more environment transition zones, or interfaces, each corresponding to an interface between in-game areas having different acoustic properties, and to predict one or more further boundaries for each identified transition zone. These transition zones may represent areas where physical or acoustic properties of the environment would change significantly, requiring separate soundboxes or other game elements to be placed in order to represent accurately the changes to a sound receiver or the player during game play. For example, in the case of the aforementioned example of moving between a field environment to a forest environment, the transition zone could be placed at an area where the trees become denser and the sky is no longer visible. By placing a soundbox wall or boundary at this transition zone, a player may experience accurate and immersive audio as the environment is traversed during gameplay.

The said one or more further boundaries in this context may be understood as conforming to, or being coincident with, or substantially so, each identified transition zone. For example, a soundbox wall may be placed in a generated soundbox along an identified interface between two environments, such as the forest environment and the field environment of the abovementioned example. That further wall may subdivide an initial soundbox into a forest soundbox and a field soundbox for instance.

This boundary prediction functionality may be implemented in a variety of ways. One example approach may involve analysing the visual features of the gameplay environment and identifying areas in which there are significant changes. These changes may indicate a change in the acoustic properties of the environment, such as the amount of reverberation, ambient and environmental sounds, etc, and therefore they may require a separate soundbox to be placed to ensure accurate and immersive audio simulation. The algorithm may use machine learning techniques, such as computer vision, to analyse the visual features of the environment and detect such areas of significant change. This may then employ geometric and physical principles to predict where the soundboxes should be placed in order to represent these distinct acoustic zones accurately. Generally, the algorithm may use any one or more of machine learning, computer vision, and acoustic principles to detect changes or transition zones in the gameplay environment that require separate soundboxes to be placed at transition zones.

It will be understood from the preceding parts of this disclosure that an acoustic model is typically a three-dimensional model and preferably includes larger features and/or geometrical elements that are present in the graphical model, while excluding smaller ones. This is reflective of larger features typically having a greater effect on the acoustic properties of an environment being simulated, and so are preferentially included over smaller features. Generating the acoustic environment model in this way optimises the accuracy of the audio simulation while conserving computational resources. In preferred embodiments, the generating of soundboxes involves a geometrical transformation of the graphical geometrical model similar to a low-pass filter, typically so as to remove high-spatial frequency geometrical objects, while preserving low-spatial frequency objects. In some preferred embodiments, therefore, the generating of the acoustic environment model comprises applying a simplification function to the three-dimensional geometrical model. The "simplification" as described in this disclosure may be understood as a process that takes a polyhedral surface model and produces a model that resembles the input model, but has significantly fewer vertices and/or faces. The simplification function is preferably applied so as to produce a second three-dimensional geometrical model corresponding to, and having a lower level of geometric detail than, the first geometrical model, preferably wherein the second three-dimensional geometric model is used in generating the acoustic environment model. This may be understood as the second three-dimensional geometric model being used or usable in the acoustic environment model, which may comprise the second model forming all or part of the acoustic environment model. The second three-dimensional geometric model may be modified or processed further in order to produce the acoustic environment model.

The simplification function itself may also be configured, in some embodiments, to produce soundboxes. For example, the method may be configured such that substantially only surfaces that bound a space, or separate it from another, are retained for the second model, and in some embodiments those surfaces may be simplified so that the bounding surfaces form a soundbox.

The aforementioned second three-dimensional geometrical model may, in some embodiments, be one and the same as the three-dimensional bounded region, or soundbox, described above. In this way, the application of the simplification function and the identifying of boundaries and creation of the bounded volume may be part of the same process. That is to say, the simplification function may be used to transform complex or geometrically detailed surfaces or walls of a space into simple planar faces of a polyhedral or cuboidal soundbox.

The second three-dimensional geometrical model may be generated in addition to that three-dimensional region in some embodiments, that is in addition to a soundbox, and may be complementary to it, or used to enhance it. For example, a set of simplified geometrical features may be added to a soundbox to enhance its acoustic accuracy by way of features not captured by a simple convex polyhedral shape.

The aforementioned lower level of geometric detail may be understood as a result of the function being configured to produce a model corresponding to the input graphical model but having fewer faces and/or vertices as noted above. In some cases, the first three-dimensional model may be so simple that no reduction in either or each of the vertices and faces can be achieved. Typically, however, most games level environments obtained as part of the method in the graphical data will include sufficient geometrical detail for a meaningful reduction in complexity to be achieved.

The second three-dimensional geometric model may be combined with a further model produced based on the first model, by another means of boundary detection and soundbox creation, in some embodiments. This may be performed, for example, by adding, overlaying, or convolving the generated models in order to produce the acoustic environment model. For instance, a soundbox may be created by the method to define boundaries of an in-game sound space, and any objects or features relevant to sound simulation in that space, such as those retained from the first model, or modified therefrom, by the simplification function for instance, can be included in the soundbox.

As alluded to above, the simplification function can comprise applying a low-pass spatial filter to the first three-dimensional geometrical model, in some preferred embodiments. This mode of simplification may be understood as being different from typical simplification techniques used for conventional three-dimensional model compression. In particular, the low-pass spatial filter used in some embodiments of the method may not be directed to visual fidelity or retaining any visual resemblance between the input and output models. Rather, it is typically adapted to retain an acoustic resemblance between the first and second models. That is, the function is preferably adapted to create a model that reproduces or closely approximates—preferably so as to be indistinguishable to a user or player during gameplay—the manner in which the sound would propagate and be perceived by a sound receiver in the level environment. Thereby the method may allow the game engine to model in-game sounds with optimised accuracy while reducing computational processing and storage requirements both during development and during gameplay.

The low-pass filter may be thought of as being analogous to such filters employed in image processing. That is, the filter may be configured to produce a three-dimensional model in which high-spatial frequency three-dimensional information, that is highly complex, or small-scale geometrical detail, has been removed, reduced, or attenuated. This reduction may be achieved by way of applying well-known polyhedral simplification techniques to part of the model at which feature sizes, which may be any of the measures of detail discussed in this disclosure, or the like, are smaller than a cut-off size, that is where the spatial frequency of the geometrical features is greater than the cut-off frequency.

In some embodiments, the simplification function is configured to exclude, from the second three-dimensional geometrical model, one or more, or each of any features that are present in the first three-dimensional geometrical model that have a level of geometric detail greater than a predetermined detail threshold. This exclusion may comprise removing features entirely, for example removing small objects placed around the room. The geometric detail level may correspond to a size, that is any one or more of: maximum or average: diameter, cross-sectional area, and volume. The function may exclude objects with a size smaller than a threshold size, for example, and this may correspond to a threshold level of geometric detail.

The level of detail and the threshold, and the comparison therebetween, may be based on any one or more of well-known metrics for detail in computer and video game graphics, as alluded to above. Examples of such metrics include maximum and/or average distance between corresponding vertices faces, closest surfaces, or inter-surface distances. The threshold is typically significantly larger than that used in modifying LODs (levels of detail) for visually rendered graphics, for the reason that it typically corresponds to the physical scale at which sound waves are not significantly affected, rather than a level of detail at which a loss of visual information is perceivable.

For example, a threshold, for the purposes of any of the above metrics, or any other metric that measures feature detail has a linear distance quality for instance, may be configured to be equal to or correspond to an in-game distance of 0.5 metres, 1 metre, 2 metres, 5 metres or 10 metres. These distances are in the order of typical wavelengths of sound frequencies audible to the human ear. The threshold may vary according to other properties of a feature or an object in the environment, for example an object type or a simulated surface material characteristic. The predetermined detailed threshold may be thought of as a threshold parameter. The threshold may correspond to a cut-off scale parameter, for another parameter of the low-pass spatial filter in such embodiments. In some preferred embodiments, the simplification of complex geometrical objects may comprise adding to, altering, or removing them, and may comprise transforming features to simpler ones. For example, a door leaf comprising mullions and mouldings may be transformed to a simple cuboid, or a plane, having similar or identical dimensions in its major axes or of its major face, to the extent of the door in the graphical model to which it corresponds. Preferably, the simplification function is configured to include, in the second three-dimensional geometrical model, geometrically simplified approximations of each or any of objects present in the first three-dimensional geometrical model that have a size greater than a predetermined threshold size. A size in this context may be thought of as a volume, in typical embodiments, which is related to the impact of the object on the space in which an in-game sound propagates, or is stimulated to propagate. It may also or alternatively correspond to the footprint of an object on the floor space of the environment, an area, and a linear extent in one or more spatial axes, and may be any one or more of these. In embodiments involving both a threshold size and a threshold detail level, the respective threshold values may be chosen so as to optimise acoustic simulation. For instance, a detail threshold may be chosen so as to exclude or attenuate detail at a scale corresponding to a distance smaller than the size threshold, for example 1 cm, 10 cm, or 50 cm, on all objects retained in the second three-dimensional model, while the size threshold may be chosen to be larger, for example so that objects with an average or maximum linear size of 1 metre, or 5 metres are retained. In this way, surface detail on those larger objects may be reduced while a simplified representation of their overall volume profile may be retained.

The threshold may also be chosen based on a game environment type, for example configuring quiet indoor spaces with a lower degree of simplification to be applied, that is a smaller size threshold and/or a higher detail threshold, compared with loud outdoor spaces in the game world. Generally, the predetermined threshold size is chosen so as to preserve large objects, without requiring all of their surface detail.

Preferably, the soundboxes produced by the method are not necessarily acoustically isolated from one another. A game level may typically include multiple soundboxes generated for it that require their own acoustic parameters but nevertheless would be expected to allow sound to be transmitted between them. This may be, for example, as a result of represented wall, window, door, and other boundary materials and their acoustic transmission properties, for example gaps or openings in boundaries such as doorways and windows in walls. Preferably, to account for such features of a graphical model, and facilitate the simulation of sound transmission therethrough, the method may further comprise applying a portal detection function or algorithm to the three-dimensional geometrical model. The portal detection function may be configured to identify therefrom one or more acoustically transmission portions, or portions that are comparatively transmissive, for instance with respect to soundbox walls at least, and may be partly or entirely transmissive, for inclusion in the acoustic environment model. The method may include modifying the acoustic environment model to include the identified acoustically transmissive portions. This may mean that the modified model allows sounds to be transmitted through identified portals or comparatively transmissive portions of bounding faces, therethrough, so as to create more accurate and immersive audio in the game.

The inclusion of the transmissive portions may comprise the creation of a gap or aperture in a soundbox wall or other surface. Instead, or additionally, the function may replace a portion of a wall or surface with a portion configured to have a different acoustic quality, or different characteristic associated with it, such as an absorption or transmission parameter, to be used when sound is simulated in gameplay. For example, a portion of a wall, modelled in a acoustic environment model as a portal, such as a glass window, may be identified in a graphical model, and the soundbox may be modified to include a correspondingly shaped and positioned portion in the soundbox, having appropriately modified acoustic properties.

For example, the portion of the wall or portal may be configured to have filtered sound transmission therethrough in order to create a muffled quality in sounds transmitted from the other side of the window. Other examples may involve an open aperture such as an open doorway, in which soundwave transmission and refraction may be simulated, rather than filtering.

Portals may also be placed in the acoustic environment model as sound sources that reproduce sounds of events or interactions in a joining or nearby soundboxes that are audible, but not visible during gameplay. In some embodiments, a portal to an adjoining part of the video game level may be provided in the acoustic model that simulates sounds originating or being transmitted or emitted from the portal, without actually including the adjoining region in the acoustic environment model, for example if no playable or visually represented area corresponding to the adjoining zone is present in the graphical or physics models. Generally, the modifying of the acoustic environment model may comprise modifying the three-dimensional soundbox region generated to represent the acoustic qualities of an environment, or modifying the second three-dimensional model, or both, particularly, the bounding walls, faces, or surfaces, thereof may be modified to include any identified portal.

A portal detection algorithm employed by the method may operate by analysing the three-dimensional geometry of the graphical data and identifying potential portals, such as doorways, windows, and other openings between in-game spaces. Once these portals have been identified, the algorithm may determine which soundboxes are adjacent to the portal, and create a new sound source at the portal location. Such a new sound source may then be used to transmit sounds, or simulate the transmission of sounds, from one soundbox to another through the portal, thereby creating more accurate audio experience during gameplay.

In order to simulate the effect of sound transmission through portals, the algorithm may, in some embodiments, use physical principles such as the attenuation of sound waves as they travel through different materials, as well as the reflection and diffraction of sound waves simulated to encounter obstacles or pass through openings in the acoustic model.

In accordance with a second aspect of the invention there is provided the system comprising: an obtaining unit configured to obtain graphical data for visually rendering a gameplay environment of the video game level, the graphical data comprising a three-dimensional geometrical model for the gameplay environment, a generating unit configured to generate, based on the graphical data, an acoustic environment model corresponding to the gameplay environment and adapted for the simulating of gameplay sounds therein.

BRIEF DESCRIPTION OF DRAWINGS

Examples of the present invention will now be described, with reference to the accompanying drawings, in which like features are denoted by like reference signs, and in which.

DETAILED DESCRIPTION

With reference to the abovementioned figures, examples of methods according to the invention are now described.

Video game development is a complex process that typically involves the following stages: concept and design, pre-production, production, testing, and release. The placement within the game environment of soundboxes, which can be thought of as geometric volumes in which audio should sound be behave or be perceivable in a particular way, typically occurs during the production stage.

Prior to the placement of soundboxes the production stage includes the creation of a physics and graphical model for a gameplay environment within a level. The physics model determines the behaviour of objects within the game world, including gravity, friction, collision detection, and the like. The graphical model, on the other hand, determines the visual appearance of the game world, including the placement and look of objects, terrain, and other environmental features.

Once the physics and graphical models have been created, the next stage of production is to create and configure the soundboxes themselves. Soundboxes are regions within the gameplay environment that define different audio characteristics. For example, one soundbox in an environment may define an area with reverb or echo, while another soundbox may define an area with a specific music track, and another may define a region within which a particular ambient sound or object-associated sound effect is audible.

During game development, sound designers typically use specialized software tools that allow them to place sound emitters within the game environment. These sound emitters can be placed anywhere within the game world, and can be configured to emit a wide range of audio effects, including music, sound effects, and ambient noise. The placement of soundboxes throughout a level is important as it allows a player or sound receiver location-dependent set of rules to be defined so as to determine how those sound emitters should interact with the game world and be perceived by the player or sound receiver. For example, they may define that certain sound emitters should only be active when the player is in a certain area, or that certain sounds should be modulated in different ways in dependence on the acoustic characteristics of a given in-game environment.

A first example involves a gameplay environment representing a room within a castle. The room contains stone walls, a stone floor partly covered by a rug, a door, two stained glass windows, a large bookshelf covering part of a wall, an alcove in a wall, and a candelabra in the centre of the room.

Figure 1A:
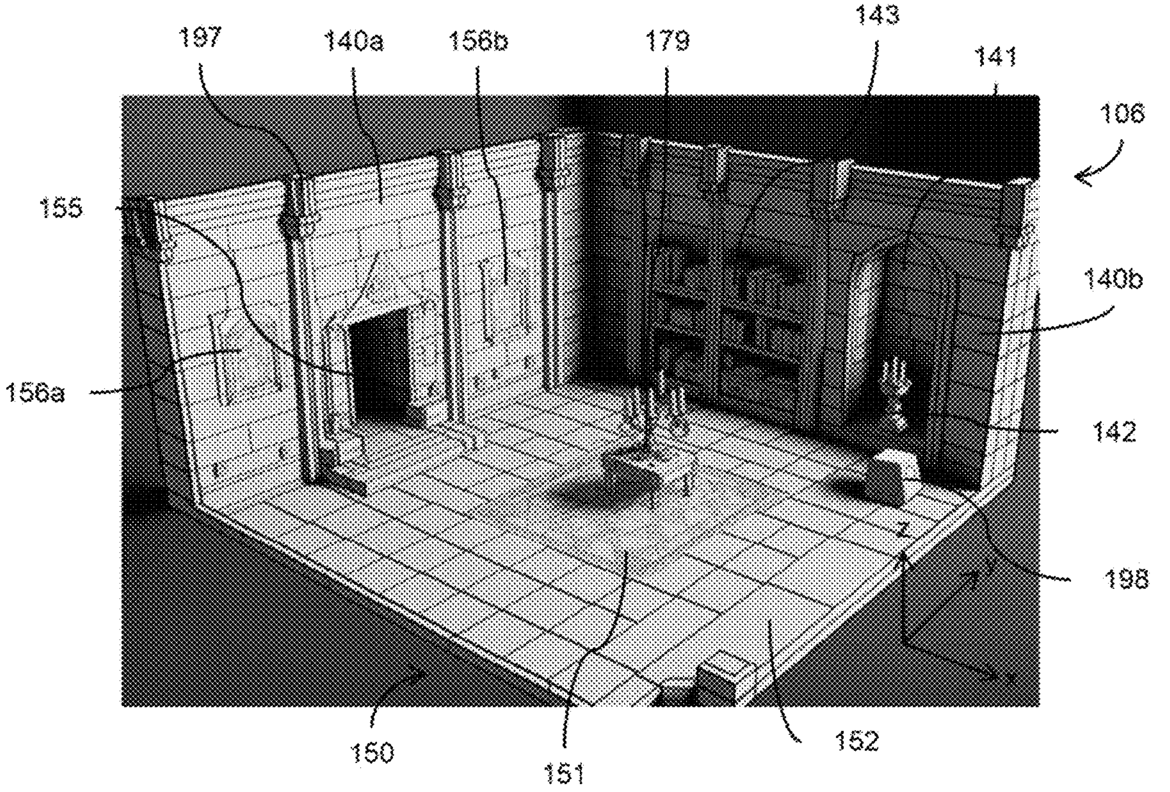
FIGS. 1A and 1B show three-dimensional renderings of a first example graphical model of a gameplay environment and an acoustic environment model corresponding to that example, respectively.

A graphical and physics model of the room is has been created, and is shown in FIG. 1A. The graphical model defines the visual appearance of the room, including the placement of objects such as walls, the rug, the bookshelf, and the candelabra. The physics model defines the behaviour of surfaces and objects within the room, including how they move and interact with each other.

Figure 2:
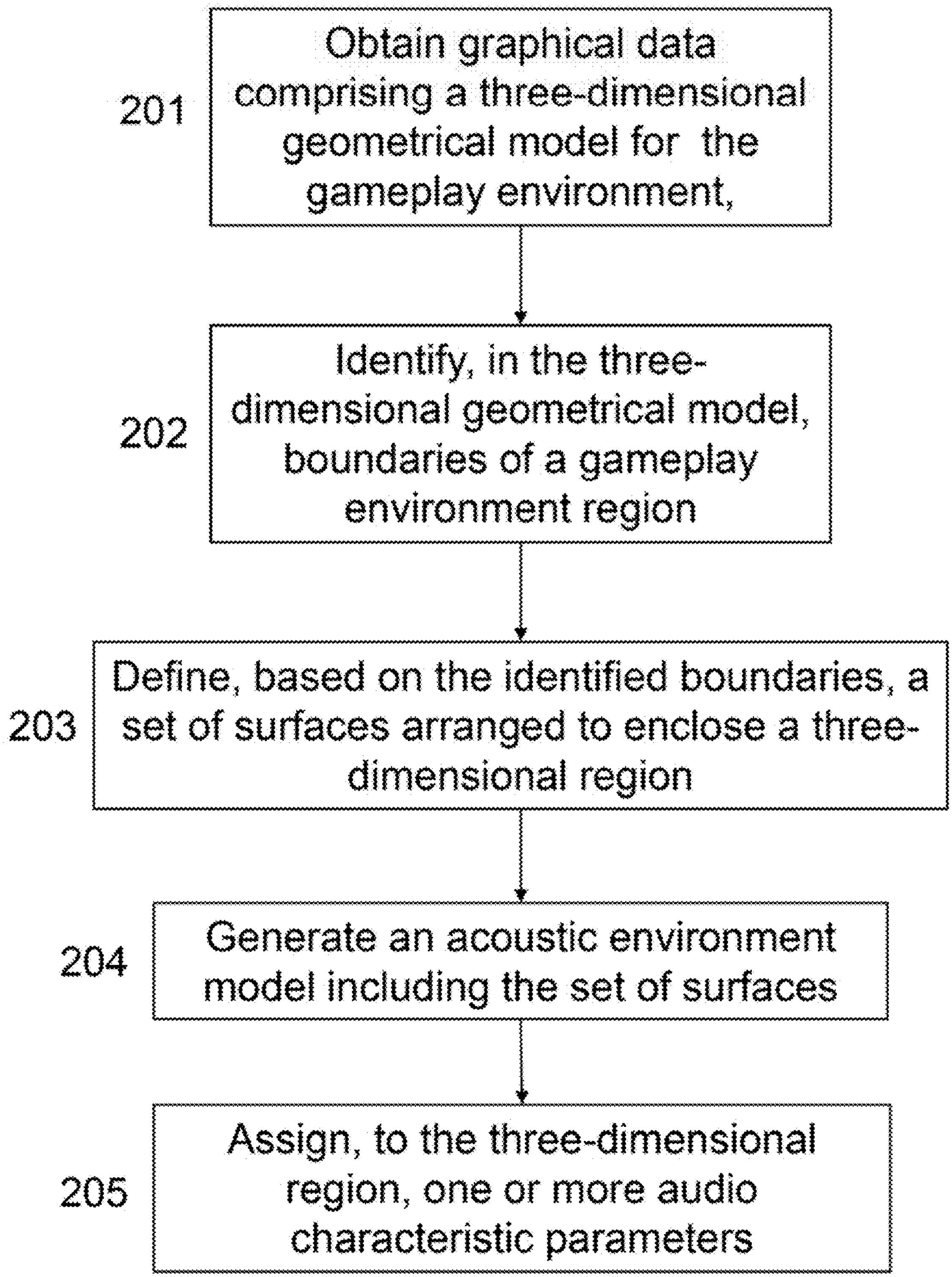
FIG. 2 is a flow diagram showing an example method of generating an acoustic environment model.

Data comprising the three-dimensional geometrical graphical model 106 depicted in FIG. 1A is provided to a computer device comprising at least one processor configured to perform the method steps outlined in FIG. 2. At step 201, the computer device accesses the graphical data.

At step 202, the computer device applies a boundary detection algorithm to the graphical model. The algorithm is adapted to identify boundaries based on the geometrical data. In particular, it is adapted to locate, within a provided geometrical model, any boundaries that are relevant to the acoustic qualities of the space represented by the model, and to the propagation of virtual sound waves within that space. In the present example implementation, the algorithm uses a combination of geometric and topological information to detect the boundaries. The algorithm firstly identifies the set of all faces in the model. Owing to the high level of geometrical detail needed to depict the complex and realistic three-dimensional objects and surfaces, the number of faces is high, and is typically in the order of thousands of faces or greater. The algorithm then determines the connectivity between adjacent faces to establish their relation. Each face is then classified as being either an exterior face, an interior face, or a boundary face. An exterior face is a face that has no neighbouring face, whereas an interior face is bounded by other faces in the model. A boundary face is a face that separates an interior region from an exterior region.

Once the algorithm identifies the boundary faces, it determines the boundaries of the space. It does this by tracing along the boundary faces and identifying edges that belong to the same boundary. The algorithm then uses these edges to form the boundaries, which are represented as a set of closed loops.

In this example, the algorithm classifies six boundaries, namely the walls, floor, and ceiling of the room environment, three of which are shown in the rendering of FIG. 1A.

Figure 1B:
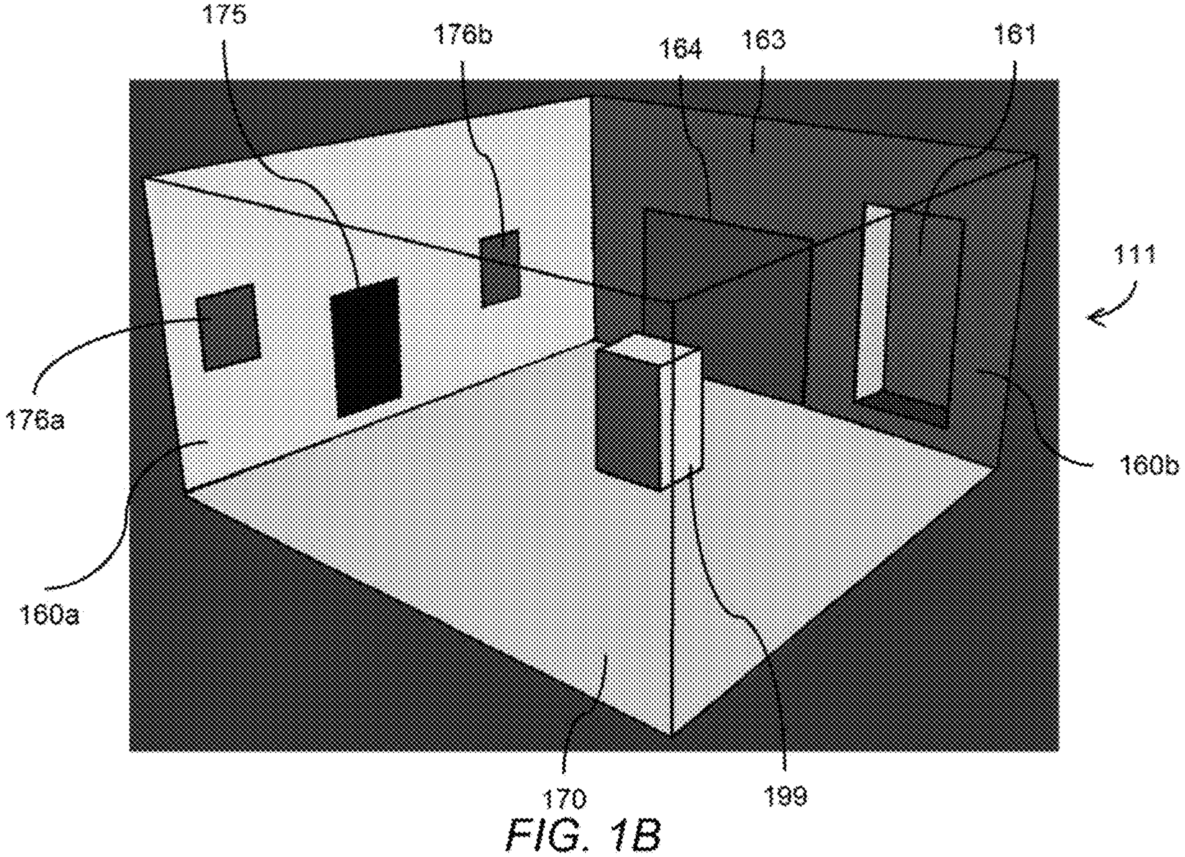

At step 203, the identified boundaries are then used, by a soundbox generation algorithm, to define a set of surfaces defining each soundbox in the environment. In the present simple example, the substantially cuboidal room in the graphical model 106 can have its acoustic properties closely approximated by a cuboid of the same dimensions and aspect ratio. The soundbox generation algorithm accordingly defines, for each of the major boundaries 140*a*, 140*b*, 150 in the graphical model 106, a planar face 160*a*, 160*b*, 170, as shown in FIG. 1B. In each of the figures, three of the graphical model boundaries and corresponding soundbox faces are omitted for clarity of illustration.

After the boundaries are identified, they can be used both to simulate the behaviour of sound waves within the space represented by the model, and also to define locations at which particular sounds are activated or modified in specific ways. Thus an acoustic environment model 111 is generated at step 204. The model 111, which may be referred to as a soundbox model, includes the major six major orthogonal faces identified based on the identified boundaries of the room. Additionally, the creation of the model includes further features, based on features of the input graphical model 106, that can be used to improve the simulation of sound in the game environment.

That is to say, the cuboidal soundbox region generated to represent the main boundaries of the room environment are enhanced in the acoustic environment model 111 with further audio-relevant features extracted from the graphical model 106. An algorithm is applied to the graphical model in order to identify any such features that ought to be included and modify the soundbox geometry accordingly.

The graphical model includes an alcove 141 recessed into the wall structure 140*b*. The algorithm identifies this feature as being suited for inclusion in the acoustic model based on its dimensions. In the present example, the depth of the alcove, that is its extent in the y-axis beyond the major face of the wall 140*b*, its extent in the x and z axes, and its volume overall are found by the algorithm to be sufficiently large, for example by comparison with linear signs or volume thresholds, to be relevant to acoustical properties. The threshold is preferably configured so that any volumes between faces such as this, which could reasonably represent spaces in which acoustic reverberation or similar effects could occur in the virtual space, are included. The method therefore modifies the acoustic environment model 111 so that the planar surface 160*b* includes a cuboidal recess 161.

The shape and dimensions of the recess are defined so as to approximate the acoustic characteristics of the corresponding feature 141 of the graphical model. However, in order to optimise the use of computational and storage resources, the shape of the void 161 is simplified so as to exclude the gothic arch detail of the geometry present in the graphical model 141, and additionally to exclude the candelabra 142 that is present in the graphical model, on the basis that these details would not substantially affect the propagation of sound waves in the virtual space.

The exclusion of these geometrical details from the modified feature 161 in the acoustic model 111 is based on a geometrical simplification function that excludes small or highly spatially variant features.

In the graphical model 106, the wall 140*b* also includes a bookshelf feature, in which a plurality of books 143 are rendered as three-dimensional objects, or as a set of faces representative of the combined surfaces of the arrangement of books. The acoustic model generation algorithm may recognise, for example by way of a machine learning model, or through a deterministic approach, that section 143 of the wall 140*b* as a distinct section suitable for being associated with different audio properties from the surrounding wall section. Accordingly, the algorithm defines a rectangular boundary 164 with a size and position on the soundbox wall 160*b* corresponding to those of the graphically rendered bookshelf 143 in the wall 140*b*.

The distinct planar region 163 of the wall that is enclosed by the boundary 164 can accordingly have acoustic properties associated with it that are different from those associated with the surrounding wall, for example corresponding to the different acoustic absorption and reflection properties of leather and stone respectively.

The generating of the acoustic environment model can also include the identification of portals within boundaries in the graphical model, that is interfaces or apertures between one in-game environment and another, such as doorways between rooms. The graphical model 106 comprises three such portals. The first of these is the doorway 155, which is a traversable portal in that it can be used by a player to travel between environments. It is desirable, therefore, for any audio effects attributable to an environment to which such a portal leads to be perceivable as though sound could propagate through that portal in a suitable manner.

Likewise, the stained glass windows 156*a*, 156*b* represented in the graphical model 106, though not configured to be player-traversable by the physics engine, will be preferably represented in the acoustic environment in a suitable way also.

The generating of the acoustic environment model 111 may therefore modify the soundbox to include a portal 175 corresponding to the doorway 155. This may be based on the inferred geometrical properties of the graphically represented door 155, for example by way of recognising through its geometry that it represents an aperture or a passageway. Additionally or alternatively the doorway 155 may be recognised as a portal by way of some data or flag identifying it as such in the graphical data or physics data.

Based on this, the soundbox of the acoustic environment model 111 is modified to include a rectangular aperture with an aspect ratio and position, and size based on those of the graphical doorway 155. The resulting acoustic portal 175 can thereafter be linked to other acoustic environment models corresponding preferably to in-game environments adjoining that from which the present acoustic environment model 111 is generated.

For example, ambient or environmental noises configured to play within an adjoining room in the castle may be audible when a player is within the soundbox 111 and at a location close to the portal 175. Suitable drop-off distances may likewise be configured to enable this location-dependent audibility.

The two windows 156*a*, 156*b* present in the graphical model 106 can be identified by the algorithm as portals in a similar manner to the doorway 155. Additionally, owing to the geometry, surface texture information, or other characteristics of the windows in the graphical information, the corresponding acoustic portals 176*a*, 176*b* can be configured to have appropriate properties, such as a lower level of sound transmission, or the application of an audio filter that muffles sounds simulated as passing through the windows, so as to represent the presence of glass windows covering the apertures 176*a*, 176*b*, in contrast with the open doorway representation 175.

Additionally, the acoustic environment model may be configured, preferably in dependence on information representative of a joining or nearby environments within the level, to include appropriate audio effects associated with the types of portals. For example, the modified soundbox may include areas proximal to the window portals 176*a*, 176*b* in which a sound effect of wind blowing or raindrops hitting glass during a storm are audible.

For any of these features, the configured audio effects may be added or modified by game developers easily, with the appropriate identification and placement of soundboxes within the acoustic environment model having been achieved by the algorithm so as to render any such sound effects more accurately and realistically, based upon the input graphical model 106.

It can be seen from FIGS. 1A and 1B that the creation of the soundbox and its modification to include acoustically relevant features omits highly-detailed geometrical features, such as the ornamentation 197 around the walls and various other small protrusions 198 into the virtual space. As alluded to earlier, the acoustic model generation algorithm is configured to exclude such features on the basis that their geometry is such that they are not needed in order to produce an accurate simulation of sound within the in-game environment.

However, the algorithm may be configured to include some features from the graphical model in spite of their high spatially variant geometry or small size, if, for example, such features are recognised as being suitable for giving rise to audio effects in the gameplay environment. For instance, the table and candelabra 179 in the centre of the room represented in the graphical model 106 is determined by the algorithm to be irrelevant to the simulation of sound wave propagation within the room, to the extent that it can be excluded from the initially produced and modified model 111. However, the graphical information may include an indication that the candles are alight, for example by way of a flickering animation associated with the graphical objects. The algorithm for producing the acoustic environment model 111 may infer from this that the object produces a sound, and may produce a corresponding feature of the soundbox 199. Once the cuboidal object 199 has been placed within the acoustic model 111, a notification may be provided to a sound designer, or the computer device itself may be configured to associate an appropriate sound effect with the object 199. For instance, the animation data for the candelabra 179 may be recognised by an algorithm as being associated with a flickering flame, and an appropriate sound effect may be sourced and associated with the corresponding region 199 in the acoustic environment model 111. In this way, when a player is in the room during gameplay, the candelabra 179 may be surrounded by a soundbox 199 that adds a warm, flickering sound effect that is audible when the player is sufficiently close to the object.

Once relevant soundbox boundaries have been defined for the acoustic environment model 111, at step 205 an audio characteristic algorithm is used to calculate the acoustic properties arising from and defined for spaces demarcated by its boundaries 160*a*, 160*b*, 170. For example, the algorithm can calculate, for the soundbox faces, reflection coefficients, transmission coefficients, and absorption coefficients based on inferences from the surfaces of the graphical model 111 that correspond to them. These properties can then be used to simulate the behaviour of sound waves within the space represented by the acoustic model 111.

In particular, the audio characteristic algorithm can be used to identify, using the graphical data 106, the various surfaces present in the room as representing walls, floors, and ceilings, and to calculate their acoustic properties accordingly. For example, the algorithm may identify, based on the texture map pattern applied to the walls 140*a*, 140*b* that those boundaries represent, or are associated with stone, and have a high reflection coefficient, while the floor, or a portion thereof comprises a carpeted area and can be ascribed a high absorption coefficient. The boundary detection algorithm can also, in some embodiments, define boundaries based on differences, discontinuities, or interfaces between different texture maps applied to surface sin the graphical model 106, and create different soundboxes, or partition soundboxes into separate portions, based thereon. For example, the carpeted area 151 can be separated from the stone floor area 152 by a soundbox boundary (not shown). That boundary can be used to define different footstep sound effect behaviour depending on whether the player is on or off the carpet, and can additionally be used to model the reverberation characteristics of the room 111 as a whole, taking account on the contrasting acoustic absorption and reflection characteristics that can be defined for the carpeted and uncovered areas.

Based on the audio characteristic calculations, the algorithm can simulate the behaviour of sound waves within the room. For example, it may predict that sound waves originating from a source in one corner of the room will reflect off the stone walls and be amplified, while sound waves originating from the same source in a different corner of the room may be absorbed by the bookshelves or a carpeted section of the floor and therefore be weaker. Such predictions can be used to design acoustic treatments for the room that will optimize its acoustic qualities for a particular application, or various in-game activities.

After the creation of soundboxes for an environment, the development process typically comprises testing their placement and making any necessary adjustments to ensure that they are placed correctly and that they produce the desired effects. This is typically done using specialized testing software that allows developers to play through the game and listen to how the soundboxes interact with the game world.

During the testing phase, developers will typically make adjustments to the placement of soundboxes and the rules that govern their behaviour based on player feedback and their own observations. The sound designer may need to adjust the size or shape of the soundboxes, as well as the specific sound effects associated with each box, based on the testing results. This iterative process ensures that the placement of soundboxes is optimized for the best possible player experience.

The soundboxes are then included in the game files and are activated by the game engine when the player enters the relevant areas within the game world during gameplay.

Figure 3A:
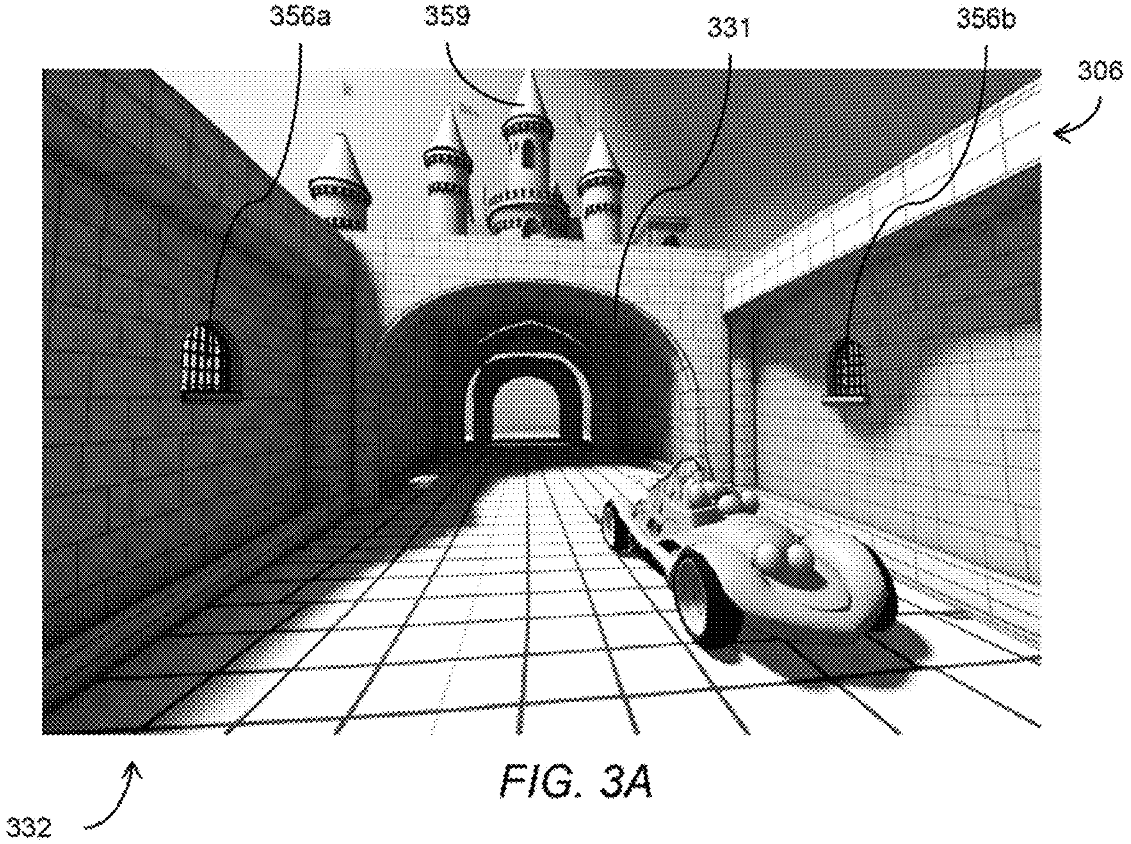
FIGS. 3A and 3B respectively show renderings of a second example graphical model and a corresponding acoustic environment model.

In the first example illustrated in FIGS. 1A and 1B, the environment modelled by the graphical information and the subsequently generated acoustic model is an enclosed space, and therefore the generated soundbox is defined as a correspondingly enclosed three-dimensional region that is surrounded on all sides by planar boundaries of the soundbox. However, the method can be used similarly for game environments that are at least partially open. An example of this is shown in FIG. 3A, which depicts a section of a racetrack represented in a graphical model 306. In this example, the environment comprises an indoor section 331 and an outdoor section 332, which can be identified as such by the presence of an overhead ceiling enclosing the tunnel 331, and the lack of any such graphical or physical boundary in the outdoor, open section 332.

When the boundary identification algorithm is applied to the graphical model 306, therefore, the resulting soundboxes include a tunnel section 334, comprising a geometrical approximation of the tunnelled structure in the graphical and physical model 331, and an uncovered section 335, in which no ceiling boundary has been detected, and so the corresponding soundbox portion 335 includes no enclosing overhead plane or surface. It will be understood that the reverberation characteristics of these two spaces will be modelled differently by the sound engine during gameplay, resulting in appropriately different acoustic qualities when sound emitters and sound receivers are located in these two soundbox sections 334, 335.

As with the first example, in the present case, the acoustic environment model is defined as a geometrically simplified approximation of the comparatively complex geometrical model comprised by the graphical data 306. In addition to the placement of simple, planar surfaces 360, 370 partly bounding the soundbox regions, and based on the major boundaries identified in the graphical model 306, various features have been omitted. For example, the soundbox modification process has not included a representation in the acoustic environment model 311 of the windows 356*a*, 356*b* present in the graphical model 306. A determination to exclude such features may be configured based on a minimum threshold size or areas for features or portals to be included or excluded from the acoustic model, for example. This threshold may be set higher for gameplay environments in which subtle acoustic effects such as those arising as a result of the presence of small windows in a wall can be expected to have no significant effect on simulated gameplay audio, such as in a racing game. The structural details 359 of the graphical model are also excluded when the acoustic model 311 is produced. This exclusion may be effected based on either or both of the distance of the graphical features 359 from a playable or traversable part of the graphical model 306 being used to create soundboxes, and the absence of such features 359 from a physics model, despite their presence in the graphical model. That is, the towers 359 may be represented in the graphical model 306 as non-interactive features, or features that have no collision during gameplay, and this information may be used to infer that they are sufficiently far removed from an immediate gameplay area as to be substantially irrelevant to sound simulation in the environment.

Figure 4A:
FIGS. 4A and 4B respectively show three-dimensional renderings of a graphical model and a corresponding acoustic environment model.
Figure 4B:
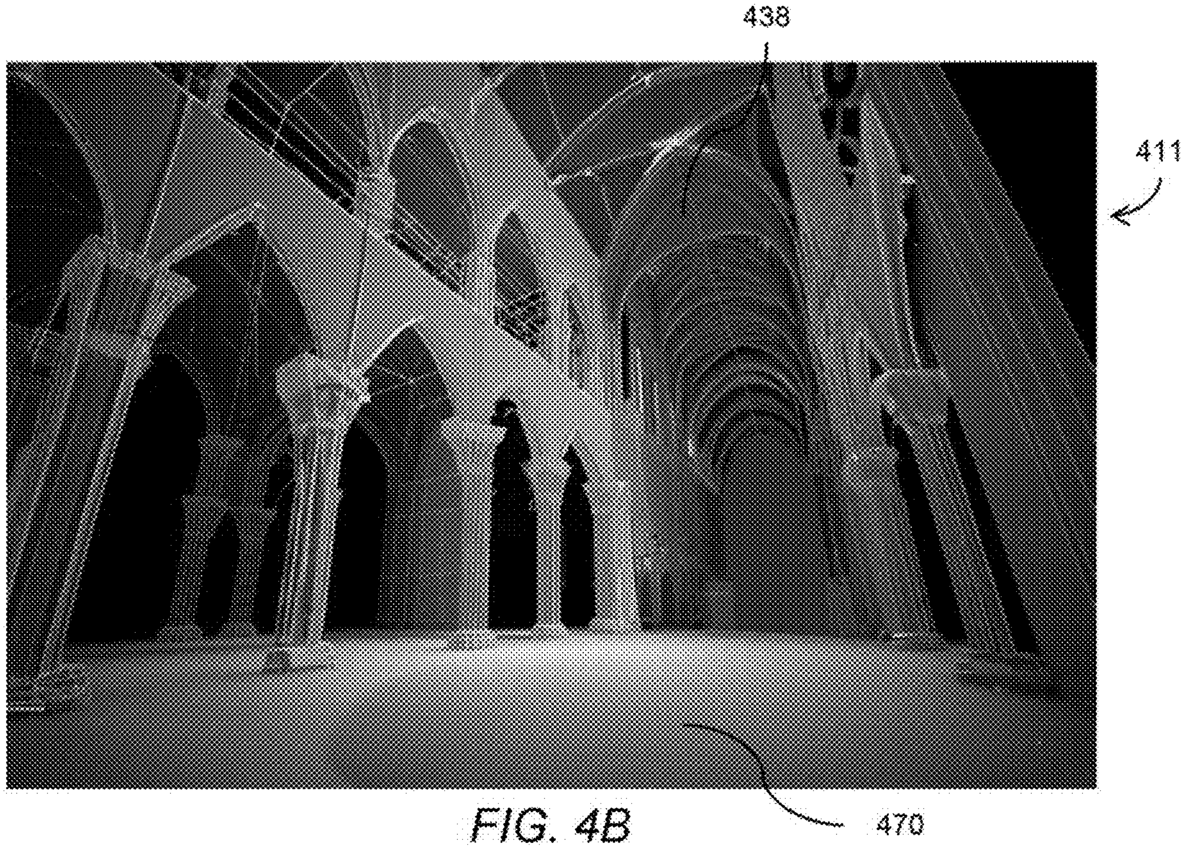

In contrast to the exclusion of certain structures and boundaries from an acoustic model, and the creation of at least partly open soundboxes, in some examples, such as the third example depicted in FIGS. 4A and 4B, the method may, in contrast to include the step of adding, to an acoustic model, boundaries that are absent from the graphical model. This capability may be relevant for cases where a graphical model, while being adequate for the visual representation of a gameplay area, does not include all of the structural information necessary to represent accurately the full geometry of the virtual space.

Figure 3B:
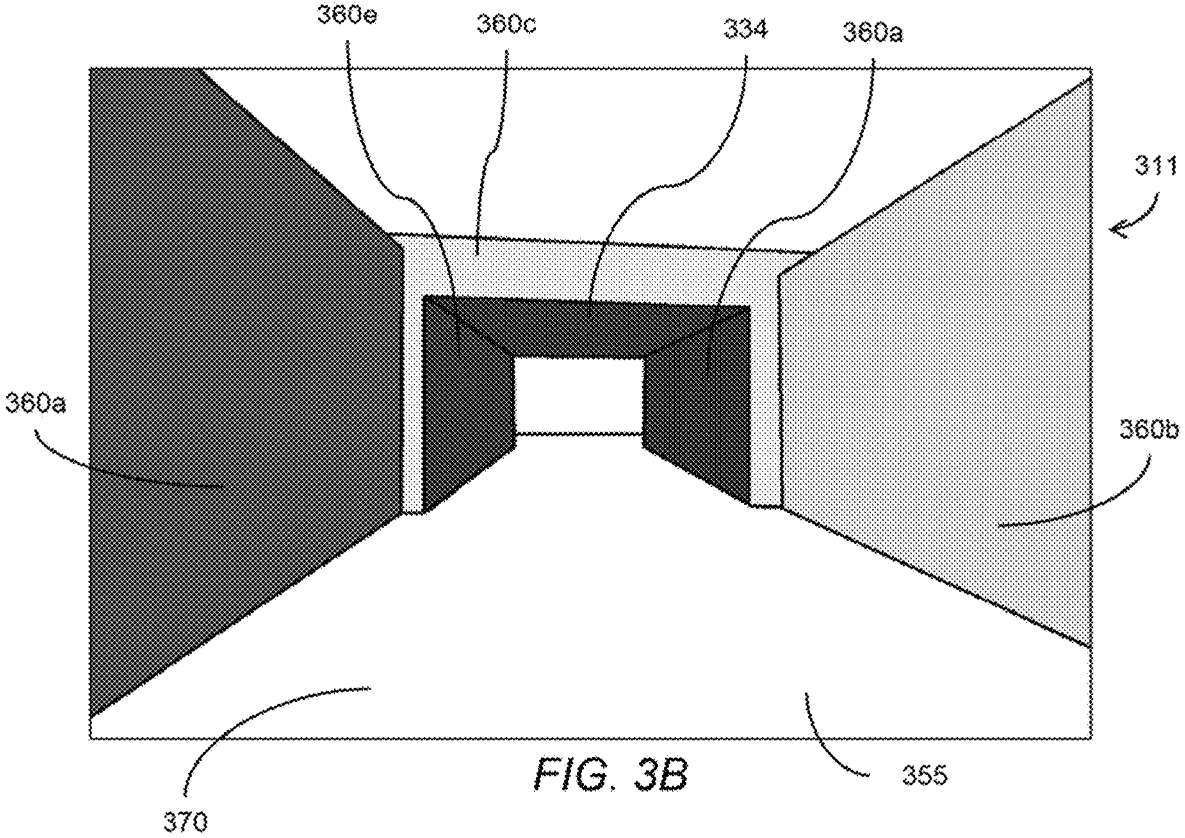

One such example is shown in FIG. 4A, which depicts a graphical model 406 of a cathedral interior. Because of the lighting conditions that are to be applied to the graphical model 406 during gameplay, the upper parts of the interior space 406 are not visible, and so the graphical model 406 does not include any geometrical information to represent any structure vertically above a given height 437. Although, because the upper parts of the environment will not be visible during gameplay, the graphical model is suitable for use by the graphics engine, the omitted structural detail renders the graphical model as such inadequate for simulating the acoustic properties of the space realistically. That is to say, detecting only the boundaries that are present in the graphical model 406 and producing soundbox bounds based purely on those existing structures would result in an open-top area, such as that shown in section 335 of the preceding example in FIG. 3B, which would result in unrealistic sound simulation.

In order to address this issue of incomplete graphical models, in the present example the method further includes a boundary prediction function configured to predict one or more further structures that should exist and are absent from the three-dimensional geometrical model 406. This function may employ, for example, a machine learning model trained on data sets including geometrical representations of realistic architectural structures or other spaces. Based on this, the prediction function may generate a predicted set of geometrical data representing missing sections 438 of a graphical model. In the present example, as shown in FIG. 4B, the function as produced a ceiling 438 comprising catenary arch structures as a result of using a machine learning model trained with three-dimensional geometrical data representative of actual architectural structures.

Once the appropriate predicted boundaries have been predicted, the generating of soundboxes may proceed, including predicted boundaries as well as those present in the graphical information 406. The resulting acoustic environment model 411 is shown in FIG. 4B.

The degree of geometrical simplification applied to the graphical model in order to produce the acoustic model 411 can you seen to be less than that in the preceding example. Such a configuration may be used when particularly high levels of sound wave propagation simulation are necessary, for example during a stealth game in which and in environments in which room acoustics are particularly noticeable, such as the cathedral environment depicted in FIGS. 4A and 4B. Nevertheless, it can be seen that some degree of simplification has been applied to the geometry, namely the exclusion of surface details in the floor 470 and the far wall 440.

Figure 5A:
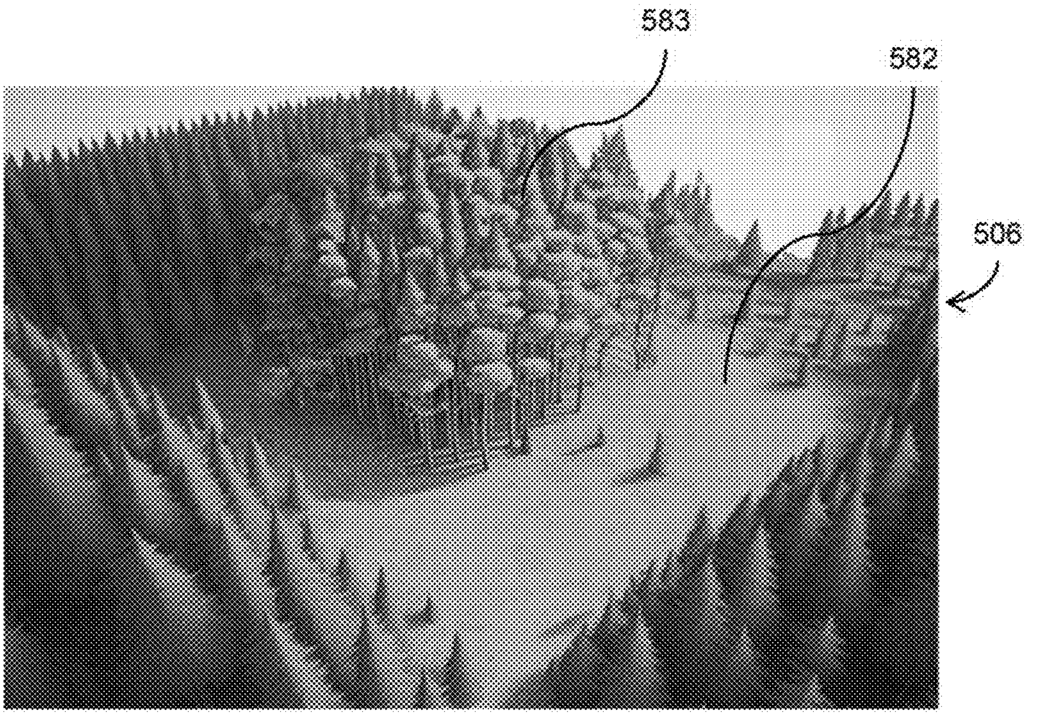
FIGS. 5A and 5B show, respectively, a fourth example graphical model and a corresponding acoustic environment model generated therefrom.

It will be understood that soundboxes need not only represent physical boundaries or enclosed spaces for the purposes of modelling acoustics. In some cases, soundboxes may be used to control locations and regions in which in-game sounds are active during gameplay. A further example environment is shown in FIG. 5A. The graphical model 506 represents an outdoor virtual space with no enclosing structures. Nevertheless, as a player moves through the virtual world, it is appropriate to simulate gameplay sounds differently as well as activating and deactivating appropriate audio cues. The boundary detection algorithm may, in the present example, be configured to identify, from the graphical model, different sub-environments, or types of environment, and transition zones separating them.

As shown in FIG. 5A, the depicted section of the gameplay environment includes a forest area 581, a meadow area 582, and a copse area 583.

Figure 5B:
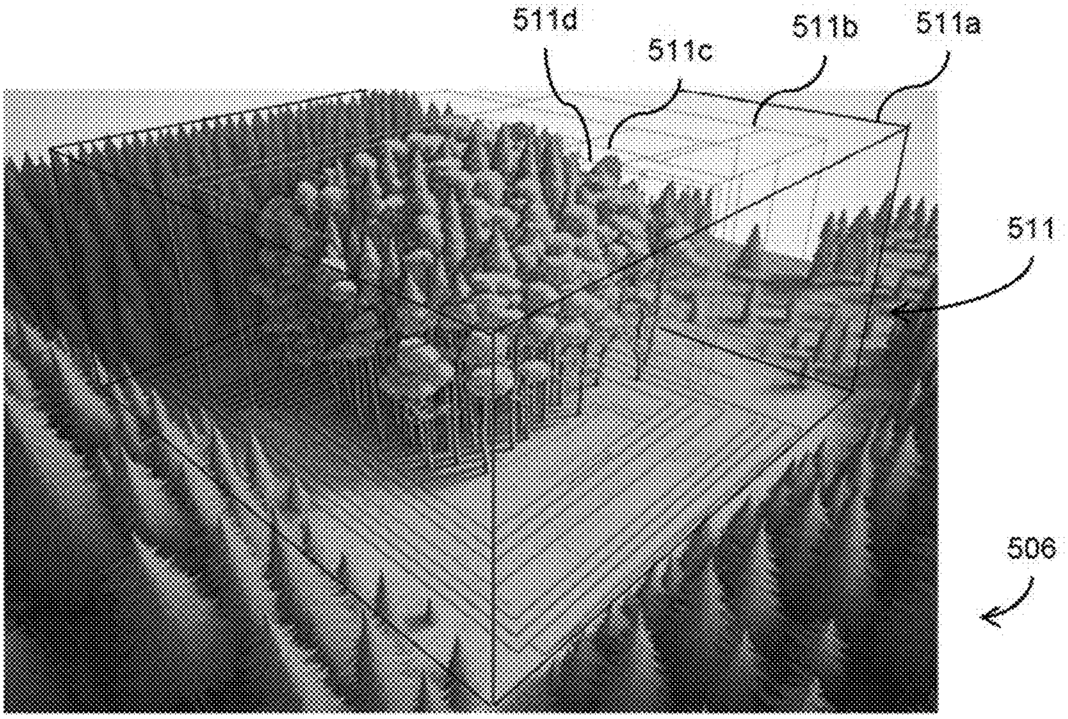

The boundary detection algorithm may employ a statistical model or a machine learning model to identify these three zones as being distinct from one another. This may be based, for example, on the density of features such as trees and other landscape details, surface textures and image data used for rendering the graphical model 506, and the shapes of features present in the areas, for example recognising different types of flora. Boundaries separating the identified regions may be identified, and soundboxes 511*a*, 511*b*, 511*c*, 511*d* can be generated to define these regions, that is their extent and the boundaries between them, in the acoustic model 511. In FIG. 5B, these cuboidal zones, which are shown as being nested within one another are overlaid on the graphical model 506.

During gameplay, when a player enters a zone, the in-game audio may be adapted in dependence on acoustic or audio characteristics ascribed to the soundbox in which the player is located. These may be environmental sounds such as birdsong and crickets chirping, as well as different musical cues associated with the different soundboxes, as well as different acoustic characteristics based on and inferred or configured sound propagation characteristic and ground firmness and texture characteristic, for example, based on the type of terrain and features present in or characteristic of a particular type of environment corresponding to a given soundbox.

The invention claimed is:

1. A computer-implemented method comprising:
obtaining graphical data for visually rendering a gameplay environment of a video game level, the graphical data comprising a three-dimensional geometrical model for the gameplay environment;
detecting one or more boundary structures that are present in the three-dimensional geometrical model;
based at least on detecting the one or more boundary structures, predicting one or more additional boundary structures that are expected to exist and that are absent from the three-dimensional geometrical model;
generating, based at least on the three-dimensional geometrical model of the gameplay environment of the video game level, an acoustic environment model that corresponds to the gameplay environment, the acoustic environment model comprising the one or more additional boundary structures that are absent from the three-dimensional geometrical model; and
simulating one or more gameplay sounds in the gameplay environment using the acoustic environment model.

2. The method according to claim 1, wherein generating the acoustic environment model comprises:
identifying, in the three-dimensional geometrical model, one or more boundaries of a region of the gameplay environment; and
defining, based on the identified one or more boundaries, a set of surfaces that are arranged to enclose a three-dimensional region within the acoustic environment model.

3. The method according to claim 2, wherein the generating of the acoustic environment model comprises assigning, to the three-dimensional region, one or more audio characteristic parameters.

4. The method according to claim 3, wherein the one or more audio characteristic parameters comprise one or more of:
a surface texture parameter;
a reverberation parameter;
a room acoustics parameter;
a room size parameter; or
an environment type parameter.

5. The method according to claim 3, comprising generating the one or more audio characteristic parameters based on the three-dimensional geometrical model.

6. The method according to claim 5, wherein the one or more audio characteristic parameters are generated based at least on one or more of:
analyzing spatial arrangement of features of the three-dimensional geometrical model,
inferring one or more material properties of the features of the three-dimensional geometrical model,
inferring one or more atmospheric conditions, or
predicting one or more ambient sound.

7. The method according to claim 2, wherein identifying the one or more boundaries comprises:
applying a boundary prediction function to the three-dimensional geometrical model to predict one or more additional boundaries; and
defining at least one additional surface of the set of surfaces for each predicted additional boundary.

8. The method according to claim 7, wherein the boundary prediction function is configured to:
identify one or more environment transition zones, each environment transition zone corresponding to an interface between in-game areas having different acoustic properties; and
predict the one or more additional boundaries for each identified environment transition zone.

9. The method according to claim 2, wherein identifying the one or more boundaries comprises:
identifying a plurality of surfaces in the three-dimensional geometrical model;
determining connectivity between adjacent surfaces in the plurality of surfaces to establish spatial relationships;
classifying each surface as an exterior surface having no neighboring surface, an interior surface bounded by other surfaces, or a boundary surface separating an interior region from an exterior region; and
tracing along the classified boundary surfaces to identify a plurality of edges associated with a common boundary, wherein the identified plurality of edges define boundaries of a gameplay zone bounded by a set of closed loops.

10. The method according to claim 1, wherein generating the acoustic environment model comprises applying a simplification function to the three-dimensional geometrical model to produce a second three-dimensional geometrical model corresponding to, and having a lower level of geometric detail than, the three-dimensional geometrical model.

11. The method according to claim 10, wherein the simplification function comprises applying a low-pass spatial filter to the three-dimensional geometrical model.

12. The method according to claim 10, wherein the simplification function is configured to exclude, from the second three-dimensional geometrical model, features that are present in the three-dimensional geometrical model and that have a level of geometric detail greater than a predetermined detail threshold.

13. The method according to claim 10, wherein the simplification function is configured to include, in the second three-dimensional geometrical model, geometrically simplified approximations of objects that are present in the three-dimensional geometrical model and that have a size that is greater than a predetermined threshold size.

14. The method according to claim 1, further comprising:
applying a portal detection function to the three-dimensional geometrical model, the portal detection function being configured to identify one or more acoustically transmissive portions for inclusion in the acoustic environment model; and
modifying the acoustic environment model to include the identified one or more acoustically transmissive portions.

15. A system comprising:
one or more processors, and
one or more non-transitory computer-readable media that store instructions which, when executed by the one or more processors, cause the one or more processors to perform operations comprising:
obtaining graphical data for visually rendering a gameplay environment of a video game level, the graphical data comprising a three-dimensional geometrical model for the gameplay environment;
detecting one or more boundary structures that are present in the three-dimensional geometrical model;
based at least on detecting the one or more boundary structures, predicting one or more additional boundary structures that are expected to exist and that are absent from the three-dimensional geometrical model;

generating, based at least on the three-dimensional geometrical model of the gameplay environment of the video game level, an acoustic environment model that corresponds to the gameplay environment, the acoustic environment model comprising the one or more additional boundary structures that are absent from the three-dimensional geometrical model; and simulating one or more gameplay sounds in the gameplay environment using the acoustic environment model.

16. The system of claim 15, wherein generating the acoustic environment model comprises:

identifying, in the three-dimensional geometrical model, one or more boundaries of a region of the gameplay environment; and defining, based on the identified one or more boundaries, a set of surfaces that are arranged to enclose a three-dimensional region within the acoustic environment model.

17. The system of claim 16, wherein generating the acoustic environment model comprises assigning, to the three-dimensional region, one or more audio characteristic parameters.

18. The system of claim 17, wherein the one or more audio characteristic parameters comprise one or more of:

a surface texture parameter;

a reverberation parameter;

a room acoustics parameter;

a room size parameter; or an environment type parameter.

19. The system of claim 17, comprising generating the one or more audio characteristic parameters based on the three-dimensional geometrical model.

20. One or more non-transitory computer-readable media that store instructions which, when executed by one or more processors, cause the one or more processors to perform operations comprising:

obtaining graphical data for visually rendering a gameplay environment of a video game level, the graphical data comprising a three-dimensional geometrical model for the gameplay environment;

detecting one or more boundary structures that are present in the three-dimensional geometrical model;

based at least on detecting the one or more boundary structures, predicting one or more additional boundary structures that are expected to exist and that are absent from the three-dimensional geometrical model;

generating, based at least on the three-dimensional geometrical model of the gameplay environment of the video game level, an acoustic environment model that corresponds to the gameplay environment, the acoustic environment model comprising the one or more additional boundary structures that are absent from the three-dimensional geometrical model; and simulating one or more gameplay sounds in the gameplay environment using the acoustic environment model.

* * * * *